No. 862,773. PATENTED AUG. 6, 1907.
A. WAHLUND.
WEED EXTRACTOR.
APPLICATION FILED APR. 26, 1907.
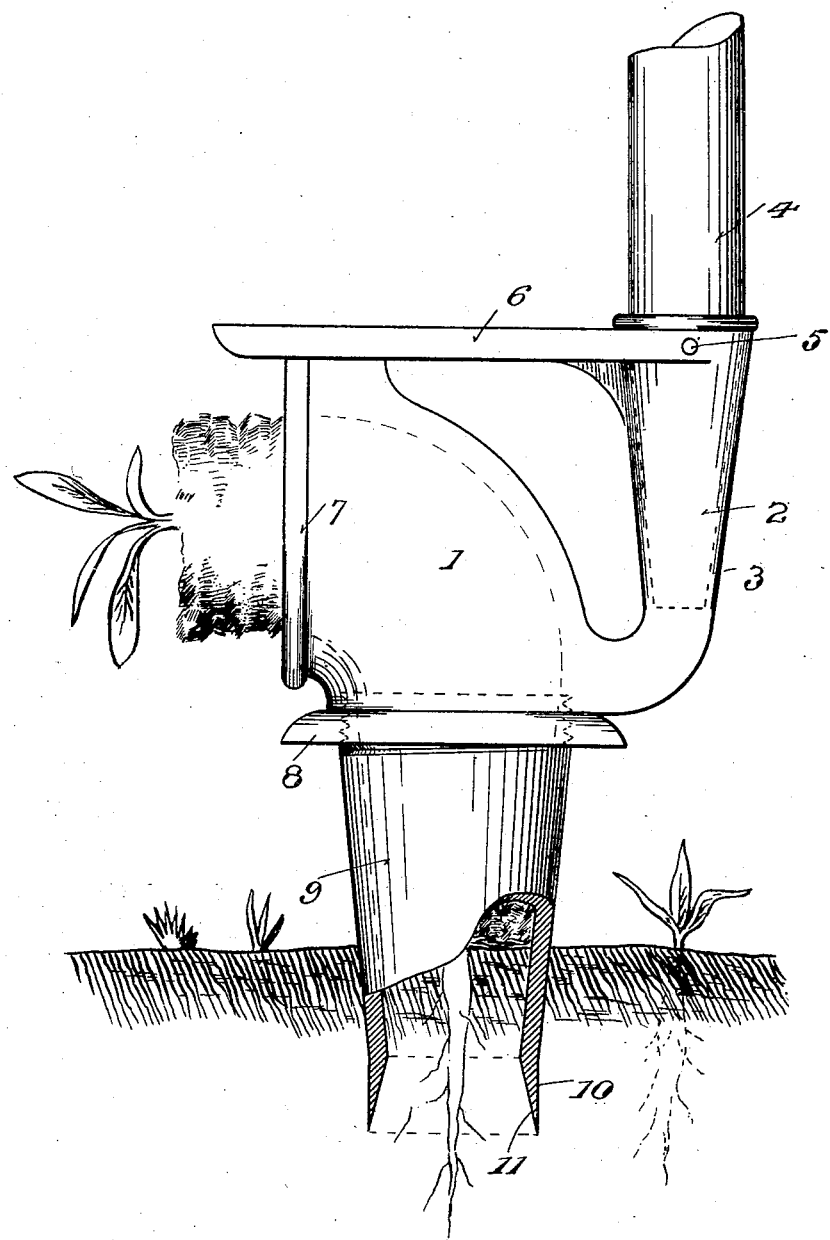
WITNESSES:
INVENTOR.
A. Wahlund,
BY
A. S. Pattison
ATTORNEY.

UNITED STATES PATENT OFFICE.

AXEL WAHLUND, OF DULUTH, MINNESOTA.

WEED-EXTRACTOR.

No. 862,773.      Specification of Letters Patent.      Patented Aug. 6, 1907.

Application filed April 26, 1907. Serial No. 370,417.

*To all whom it may concern:*

Be it known that I, AXEL WAHLUND, a subject of the King of Sweden, residing at Duluth, in the county of St. Louis and State of Minnesota, have invented certain new and useful Improvements in Weed-Extractors, of which the following is a specification, reference being had therein to the accompanying drawing.

My invention relates to improvements in weed extractors.

The object of my invention is to provide a device of this character, in which the weeds may be readily removed from the ground, and can be operated either by hand or foot power, or both, and formed of two coöperative parts, so that the more destructible part may be easily removed and replaced by a new part, when it becomes worn.

Another object of my invention is to provide a more simple, cheap and effective device of this character.

In the accompanying drawings, Figure 1, is a side elevation partly in section, of my improved weed extractor in operation.

Referring now to the drawings, 1 represents a hollow metal elbow having formed integral therewith at its lower end, the vertically disposed socket 2 having the vertical tapering opening 3 therein to receive the handle 4. The said handle may be of any desired structure, and is secured within the socket by means of a transverse pin 5 passing through the socket. The upper end of the elbow 1 and the socket 2 are connected by a flat horizontal brace 6 which is formed integral with both the elbow and the socket. This brace is of a broad, flat form, and serves as a foot plate upon which pressure is applied, while extracting the weeds, as will be hereinafter more fully described.

The upper neck of the elbow extends in a horizontal plane and is surrounded by a beading 7 which strengthens the same, supporting the brace or foot piece 6. The lower end of the elbow is in a vertical plane, and is provided with an outwardly-extending flange 8 which serves to limit the downward movement of the extractor in the ground. The lower end of said elbow is internally screw-threaded, and in which the upper end of the tapering bit 9 is screwed. The said bit, as shown, is arranged in a vertical position, and tapers towards the lower end, the upper end being greater in diameter than the lower end. The lower end of the bit, for a short distance, is made with its outside walls vertical, and parallel, as shown at 10, while the inside walls are inclined outwardly in a downward direction, as shown at 11, forming a sharp-edged, bell-shaped mouth to the bit, as clearly shown in the drawing. By this arrangement, it will be seen that I provide the bit with a sharp lower cutting edge, which will enter the soil easily, and at the same time compress the soil as it enters the bit until it reaches a point above the bell-mouth, when the compression is released and the soil is forced through the elbow in the compressed state with as little friction as possible.

The handle 4, as before stated, is of any form, but is made sufficiently long to be conveniently carried in the hand, and when it is desired to extract a certain weed, the bit is placed over it and forced down around the same by pressure on the handle 4, or by pressure upon the brace 6, the bit compressing the earth as it is forced down, and when the device is withdrawn, it will carry with it all the soil, together with the weed, it being held by the compression caused by the bell-mouth of the bit. When a subsequent application is made, the incoming earth and weed will engage and force the previously-compressed earth up through the elbow and out of the open horizontal end, the discharge of the soil and weed thus becoming automatic. The bit is the only part that becomes worn, and by its screw-threaded connection with the elbow, makes it readily removable and a new bit attached.

Having thus described my invention, what I claim and desire to secure by Letters Patent, is:—

1. In a weed extractor, a tapering cylindrical bit having an outwardly-tapering bell-shaped cutting lower end, and means at its upper end for operating the same.

2. In a weed extractor, a cylindrical bit having an internal bell-shaped lower end, and means at its upper end for operating the same.

3. A weed extractor consisting of a hollow elbow-shaped upper portion and a detachable cylindrical-shaped-edged lower portion, and means attached to the elbow for operating the extractor.

4. A weed extractor comprising a hollow elbow-shaped upper portion and a cylindrical-shaped-edged lower portion, said upper portion being provided with hand and foot operating means.

5. A weed extractor, comprising a hollow elbow-shaped upper portion, a hollow bit removably screwed within said elbow and tapering towards its lower end, and having the extreme lower end provided with parallel outer walls and outwardly-inclined inner walls.

6. A weed extractor, comprising a hollow elbow-shaped upper portion, a hollow bit removably secured within said elbow and tapering towards its lower end, and having the extreme lower end provided with parallel outer walls and outwardly-inclined inner walls, and said elbow being provided with hand and foot operating means.

7. A weed extractor comprising an elbow-shaped upper member having an upwardly-extending handle-socket carried by the lower end, a handle secured within the socket, a combined brace and foot piece connecting the upper ends of the socket and the elbow, and a removable hollow bit connected with and in communication with said elbow.

8. A weed extractor, comprising an elbow-shaped upper member, an upwardly-extending handle-socket carried by the lower end of the elbow, a handle secured within said socket, a horizontal brace and foot piece connecting the upper ends of the socket and elbow, and a hollow bit screwed within the lower end of the elbow and tapering downwardly, and its lower end provided with parallel outer walls and outwardly-inclined inner walls.

In testimony whereof I affix my signature in presence of two witnesses.

AXEL WAHLUND.

Witnesses:
S. GEO. STEVENS,
DONALD McLENNAN.